(12) United States Patent
Kordon

(10) Patent No.: US 6,705,346 B2
(45) Date of Patent: Mar. 16, 2004

(54) BISTABLE SOLENOID VALVE

(75) Inventor: Rolf Kordon, Giengen (DE)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 0 days.

(21) Appl. No.: 10/356,105

(22) Filed: Jan. 31, 2003

(65) Prior Publication Data
US 2003/0136928 A1 Jul. 24, 2003

Related U.S. Application Data

(63) Continuation of application No. PCT/EP01/08680, filed on Jul. 26, 2001.

(30) Foreign Application Priority Data

Jul. 31, 2000 (DE) .......................................... 100 37 251

(51) Int. Cl.$^7$ ............................................... F16K 11/07
(52) U.S. Cl. .............................. 137/625.5; 137/625.65; 251/65
(58) Field of Search ........................ 137/625.5, 625.65; 251/65

(56) References Cited

U.S. PATENT DOCUMENTS

| | | |
|---|---|---|
| 3,977,436 A | 8/1976 | Larner |
| 4,534,539 A | 8/1985 | Dettmann |
| 5,551,482 A * | 9/1996 | Dixon et al. ........... 137/625.65 |

FOREIGN PATENT DOCUMENTS

| | | |
|---|---|---|
| DE | 37 18 490 A1 | 12/1987 |
| EP | 0 333 452 A2 | 9/1989 |
| EP | 0 339 339 A2 | 11/1989 |
| EP | 0 711 944 A1 | 5/1996 |
| WO | WO 92/07210 | 4/1992 |

* cited by examiner

Primary Examiner—Gerald A. Michalsky
(74) Attorney, Agent, or Firm—Laurence A. Greenberg; Werner H. Stemer; Ralph E. Locher

(57) ABSTRACT

A solenoid valve, in particular, for a refrigerating machine, includes a valve body with an inlet and two outlets, a valve element that can be moved in the valve body between two end positions corresponding respectively to different switching positions of the solenoid valve, at least one permanent magnet for holding the valve element in the respectively assumed end position, and a magnet coil for exerting on the valve element a magnetic force effecting a shift into the respective other end position. The valve body and the magnet coil are accommodated in two compartments of a housing, and the at least one permanent magnet is held in a receptacle on a wall of the housing in a fashion facing a middle position of the valve element situated between the two end positions.

19 Claims, 3 Drawing Sheets

BISTABLE SOLENOID VALVE

CROSS-REFERENCE TO RELATED APPLICATION

This application is a continuation of copending International Application No. PCT/EP01/08680, filed Jul. 26, 2001, which designated the United States and was not published in English.

BACKGROUND OF THE INVENTION

1. Field of the Invention

Prior art configurations mount the individual components in a complicated fashion one after another around the solenoid valve.

2. Summary of the Invention

It is accordingly an object of the invention to provide a bistable solenoid valve that overcomes the hereinafore-mentioned disadvantages of the heretofore-known devices of this general type and that has a simplified configuration and can, therefore, be produced with a low outlay and cost effectively.

With the foregoing and other objects in view, there is provided, in accordance with the invention, a solenoid valve, including a housing of a non-magnetic material, the housing having two compartments and a wall with a receptacle, a valve body having an inlet and two outlets, a valve element moveably disposed in the valve body between two end positions corresponding respectively to different switching positions of the valve element, the two end positions of the valve element defining a middle position therebetween, the receptacle facing the middle position, at least one permanent magnet disposed in the receptacle for holding the valve element in a respectively assumed one of the two end positions, and a magnet coil for exerting on the valve element a magnetic force effecting a shift into a respective one of the two end positions, the magnet coil and the valve body accommodated in the two compartments. Preferably, the valve is part of a refrigerating device.

According to the invention, it is possible to reverse the sequence of the assembly of the components of the solenoid valve by virtue of the fact that the valve body and the magnet coil are, respectively, accommodated in compartments and the permanent magnet is held in a receptacle on a wall of the housing of the solenoid valve.

In contrast to the prior art, in accordance with the present invention, the components are mounted conveniently on the housing in sequence, a preformed receptacle for the permanent magnet and compartments for valve body and magnet coil permitting these components to be mounted relative to one another quickly, conveniently, and with a high degree of dimensional stability. Because the relative position of the components one to another is prescribed by the compartments and the receptacle, the exact positioning of the individual components relative to one another that is required for the reliable functioning of the solenoid valve results automatically.

In accordance with another feature of the invention, the receptacle of the permanent magnet is, preferably, constructed as a recess of the housing open toward the housing interior. Such a configuration permits the permanent magnet to be disposed in direct contact with the valve body held in the housing.

In accordance with a further feature of the invention, preferably, the permanent magnet is held in the recess by latching hooks. This permits the magnet to be mounted by simply being latched in.

In accordance with an added feature of the invention, the housing expediently includes two parts or shells that adjoin one another at a plane defined by longitudinal axes of the coil and of the valve body. These two parts can be latched to one another conveniently after fitting the magnet coil and valve body in their respective compartments.

In accordance with an additional feature of the invention, a permanent magnet can be disposed on each of the two parts such that the two permanent magnets are situated on either side of the parting plane of the two parts.

To be able to connect electric supply lines conveniently to the magnet coil, in accordance with yet another feature of the invention, the housing is, expediently, provided with a cover that permits access to supply terminals of the magnet coil.

In accordance with yet a further feature of the invention, the cover is, expediently, connected to the remainder of the housing by a film hinge. Such a cover can be produced conveniently in one part with an adjoining region of the housing, for example, by injection molding.

In accordance with yet an added feature of the invention, the cover and an adjoining edge of the remainder of the housing, expediently, form a holder for a strain relief device of a supply cable of the magnet coil.

In accordance with yet an additional feature of the invention, the magnet coil has a supply cable and the cover has an adjoining edge with respect to the housing, and there is provided a strain relief device for the supply cable, the strain relief device disposed at the cover at the adjoining edge.

In accordance with again another feature of the invention, at least one of the housing and the cover has a strain relief device for the supply cable.

In accordance with again a further feature of the invention, the cover has a cover edge opposite the film hinge, the housing has a housing edge adjoining the cover edge when the cover is closed and the housing and the cover each have a strain relief device for the supply cable at the cover edge and the housing edge.

In accordance with again an added feature of the invention, the valve body is, preferably, embodied as a cylinder with an inlet in an axial center of the valve body and two outlets at opposing end faces. Such a configuration of the valve body permits convenient production, for example, by inserting two elements respectively forming a valve seat and an outlet into a cylindrical tube from the ends.

In accordance with again an additional feature of the invention, an inlet tube connected to the inlet is guided through a socket formed on the two parts of the housing. As such, the valve body is secured in its compartment both against rotation about its axis and against displacement in the direction of the axis.

In accordance with still another feature of the invention, the cylindrical valve body has a longitudinal direction, the housing has an interior, the receptacle of the permanent magnet is a recess of the housing open toward the interior, the housing has latching hooks holding the permanent magnet in the recess, and the latching hooks are spaced apart transverse to the longitudinal direction.

In accordance with still a further feature of the invention, there is provided a plurality of fastening lugs with different orientations is constructed on the outer surface of the housing for the purpose of flexibly assembling the solenoid valve in different application environments.

In accordance with a concomitant feature of the invention, the ends of the valve body are, preferably, exposed at the outer surface of the housing. Such a configuration permits the use of the housing both for valve bodies that are mounted in the housing in a fashion already fitted with outlet lines, and for valve bodies in the case of which the outlet lines are not fastened, in particular, not soldered, on the ends of the valve body until the valve body is fitted in the housing and, possibly, until the housing is mounted in its application environment. For the last case, in particular, it is expedient that the housing is produced from a heat resistant material, in particular, from a plastic such as polypropylene, for example, that withstands temperatures occurring during soldering of the connecting lines to the surface of the valve body without being damaged.

Other features that are considered as characteristic for the invention are set forth in the appended claims.

Although the invention is illustrated and described herein as embodied in a bistable solenoid valve, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
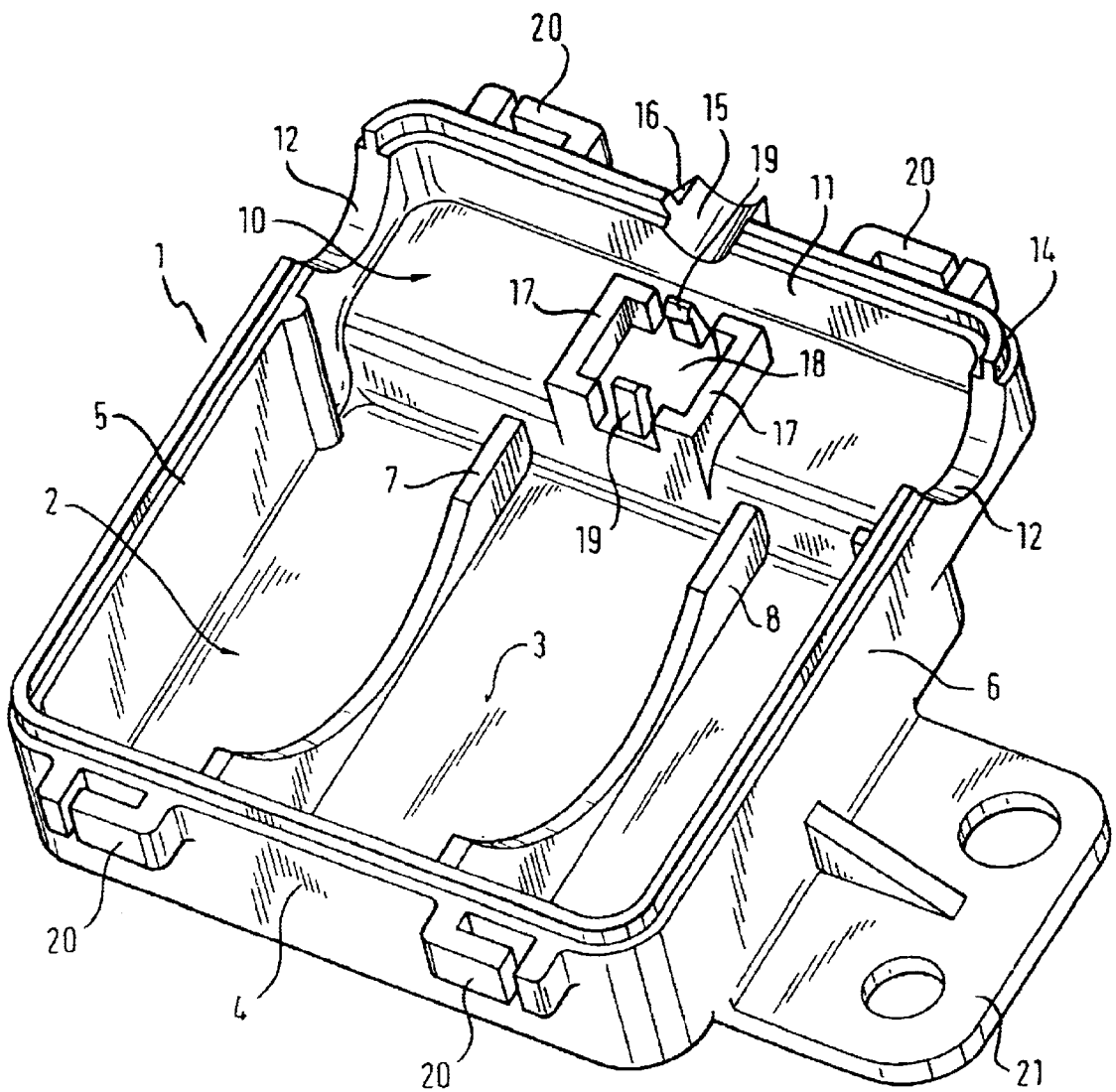
FIG. 1 is a perspective view of a lower housing part of the solenoid valve according to the invention.

Referring now to the figures of the drawings in detail and first, particularly to FIG. 1 thereof, there is shown a perspective view of a first housing part, here denoted as lower housing part 1, of the solenoid valve according to the invention. Preferably, the valve is used in a refrigeration device. The housing is produced from polypropylene using injection molding. It has a first compartment 2, which is bounded by a bottom 3 and side walls 4, 5, 6. Two ribs 7, 8 extend over the bottom 3 starting from the side wall 4. They each have a cutout in the shape of a circular arc whose diameter is adapted to the configuration of an substantially cylindrical magnet coil 9 (see FIG. 2) that is to be accommodated in the first compartment 2 and is disposed such that the longitudinal axis of the magnet coil 9 lies in a plane defined by the common top edge 14 of the side walls.

Adjoining the first compartment 2 at the ends of the ribs 7, 8 averted from the side wall 4 is a second compartment 10, which is bounded by the side walls 5, 6 and a fourth side wall 11. Two semicircular cutouts 12 are provided in the side walls 5, 6 to accommodate a cylindrical valve body 13 (see FIG. 2). The diameter of the cutouts 12 corresponds to that of the valve body 13 such that the longitudinal axis thereof, likewise, comes to lie in the plane of the common upper edge 14.

A further semicircular cutout 15 is disposed in the middle of the fourth side wall 11 and lengthened up by a semicircular projection 16.

Figure 2:
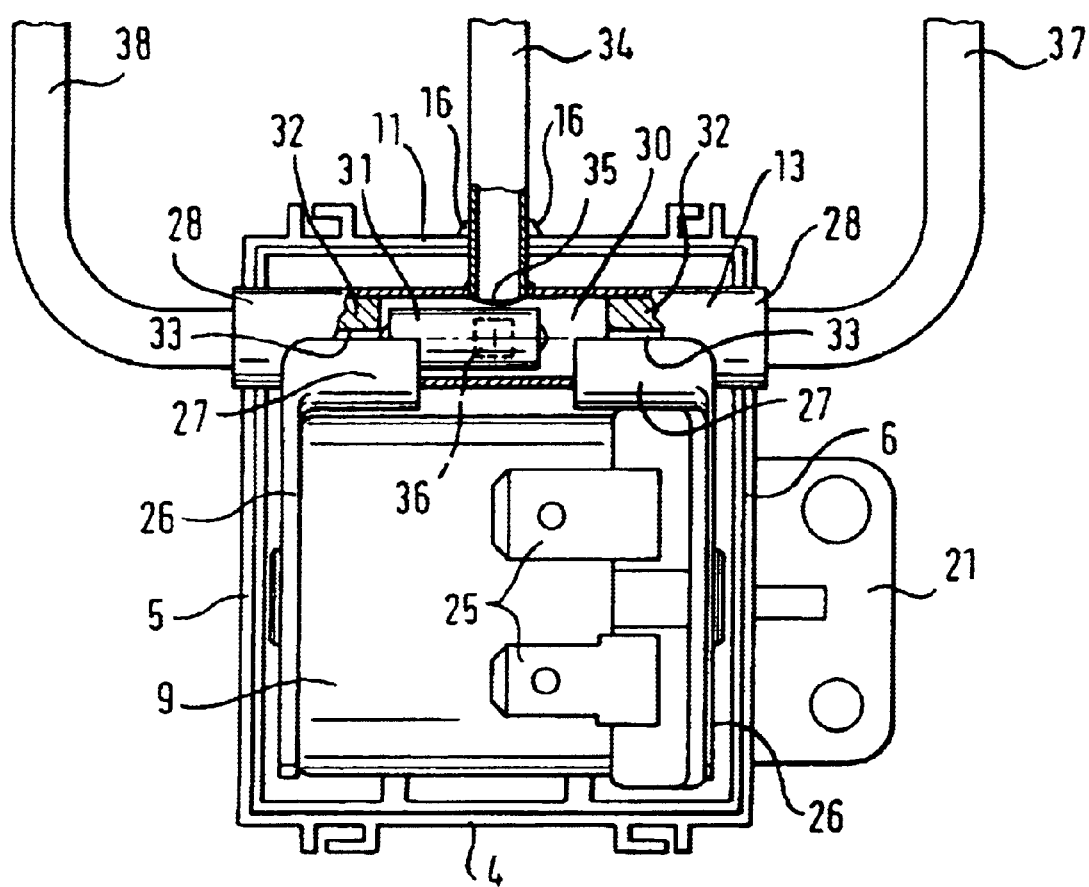
FIG. 2 is a partially cut away plan view of the lower housing part of FIG. 1, with a valve body and a solenoid valve fitted therein.

Two C-shaped walls 17 formed in a projecting fashion on the bottom of the second compartment 10 bound a recess 18 that is provided for accommodating a permanent magnet 36 (see FIG. 2). Two latching hooks 19 projecting from the bottom of the second compartment 10 between the walls 17 serve the purpose of anchoring the cuboid permanent magnet 36 in the recess 18. The latching hooks 19 are spaced apart transverse to the longitudinal direction of the valve body, and their height is coordinated with the diameter of the cutouts 12 such that they can hold a cuboid permanent magnet in a position in which it touches the outer wall of the valve body 13 without the latching hooks 19 themselves abutting against the valve body 13 with their region projecting beyond the surface of the magnet.

Two pairs of latching lugs 20 are integrally formed at the level of the top edge 14 on the side walls of the lower housing part, here the walls 4 and 11. Furthermore, a fastening lug 21 with two bores for screwing or riveting the lower housing part 1 onto a support is integrally formed on the side wall 6.

The assembly of the solenoid valve is performed by firstly latching a permanent magnet into the recess 18, and then inserting a magnet coil 9 and valve body 13 into their compartments 2 and 10, respectively. This state is shown in plan view in FIG. 2.

The magnet coil 9 has a cylindrical coil former on whose right-hand end in the figure two angled-away contact shoes 25 are disposed for supplying the coil with power. Riveted on the end faces of the iron core of the coil 9 are two strip-shaped irons 26 that are bent over at the outer circumference of the magnet coil 9 and formed into pole shoes 27 with a semicircular cross-section.

The pole shoes 27 embrace the outside of the cylindrical valve body 13 in a self-closed fashion. The body 13 is situated at its ends 28 in the cutouts 12 of the lower housing part 1.

The valve body 13 is shown in FIG. 2 in partially cut away fashion to illustrate its mode of operation. A chamber 30 in the interior of the valve body 13 is bounded at two ends by valve seats 32 that each have a central bore that constitutes an outlet 33 of the valve. An inlet line 34 is soldered on an inlet 35 of the valve opening centrally into the chamber 30. A valve element 31 in the form of a cylindrical body made from ferromagnetic material with a ball pressed against each end face of the cylindrical body can be moved between two end positions in which in each case one of the balls bears against one of the valve seats 32 and seals the corresponding outlet 33. The permanent magnet 36 accommodated in the recess 18 is indicated in the figure by a dashed contour. The magnet 36 is situated exactly halfway between the two valve seats 32. In the case of the position of the valve element 31 shown in the figure, the element 31 forms a magnetic circuit that runs, starting from the magnet 36, through the valve element 31, the left-hand valve seat 32, the left-hand pole shoe 27 and back to the magnet 36. This magnetic circuit holds the valve element 31 stably in the position shown, and a cooling fluid can flow from the inlet line 34 through the valve body to the right-hand outlet line 37, whereas the path to the left-hand outlet line 38 is sealed.

The valve 31 is not permanently magnetized, but it has an inductive magnetization due to the magnetic circuit. When a current impulse of suitable polarity that, between the two pole shoes 27, generates a magnetic field opposite to the induced magnetic flux in the valve element 31 is applied to the contact shoes 25, the valve element 31 is shifted from the end position shown in FIG. 2 into the opposite end position, in which it blocks the passage from the inlet line 34 to the outlet line 37 and unblocks the passage to the outlet line 38. In such an end position, a magnetic circuit analogous to the one described above is formed between the permanent magnet 36 and the left-hand valve seat 32 and keeps the valve element 31 in the end position. The valve body is shifted back into the end position shown in the figure by a current impulse of opposite polarity.

Figure 3:
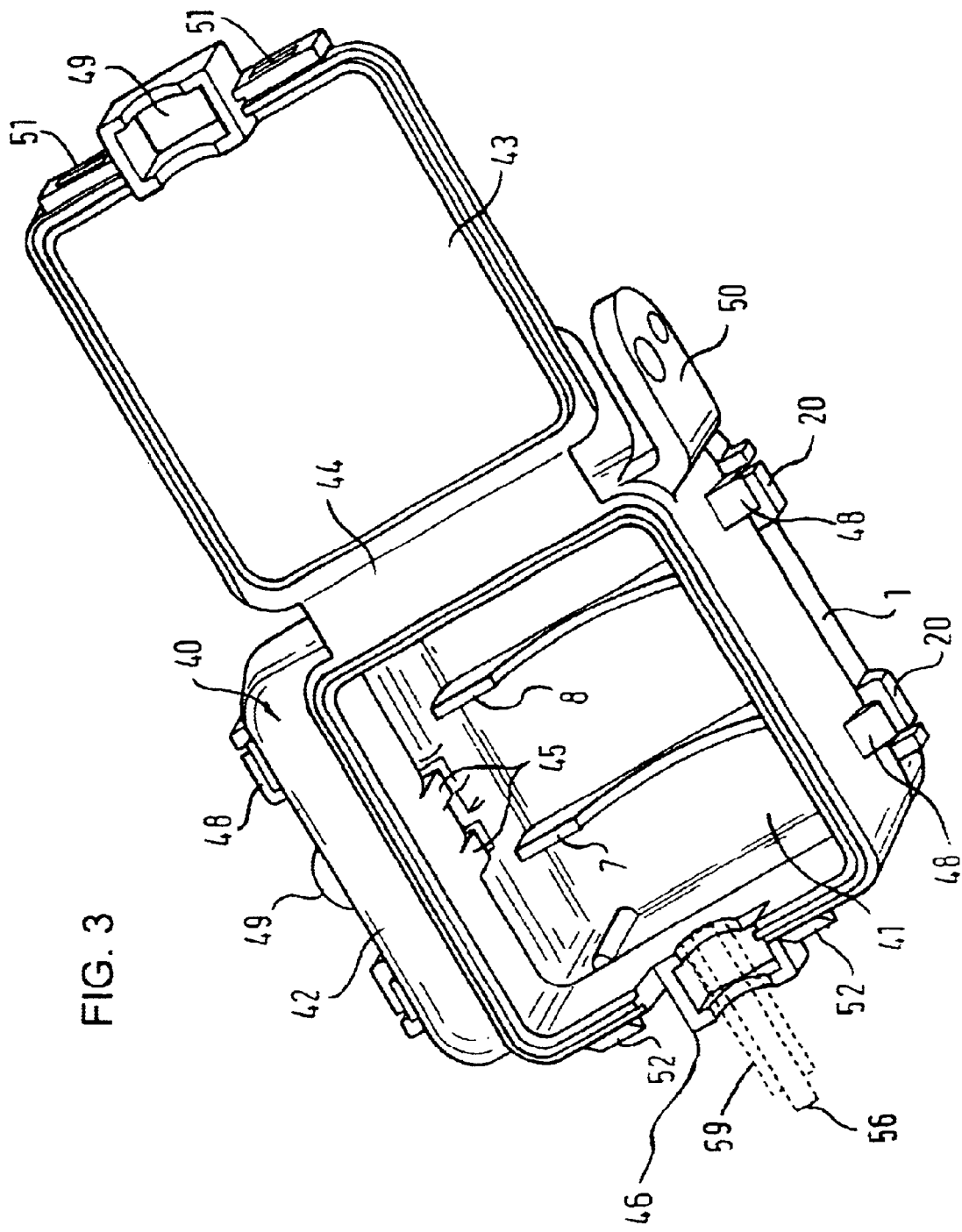
FIG. 3 is a perspective view of two housing parts according to the invention connected to one another.

The solenoid valve is completed by an upper housing part 40 that is shown in FIG. 3 in a perspective view on the lower part 1, but without the magnet coil and valve body. Like the lower part 1, the upper part 40 also has a first compartment 41 for the coil and a second compartment 42 for the valve body. The first compartment 41 is higher than the corresponding compartment 2 of the lower part to accommodate therein the angled-away contact shoes 25, and, instead of a bottom with ribs thereon, the upper housing part 40 has a ribless cover 43 that is produced with the remainder of the upper part 40 in one storey by injection molding, and is connected to the latter by a film hinge 44.

Also provided in the compartment 42 of the upper part 40 is a recess for accommodating a second permanent magnet that is a mirror image of the recess 18 and of which a part of the C-shaped walls 45 is to be seen in the figure. This recess is situated exactly opposite the recess 18, and the permanent magnet in it is polarized opposite to the permanent magnet 36 in the recess 18 such that the fields of the two permanent magnets are superimposed on one another to form a field orientated exactly in the axial direction of the valve body in the region of the valve seat 32.

One of the two recesses can be omitted in a simplified refinement of the solenoid valve, and only one permanent magnet is used to hold the valve element 31 in one of its two end positions. In addition to the cost reduction due to the saving of a magnet, such a variant has the advantage that it is no longer necessary when inserting the magnet into the recess to have regard to correct polarity, whereas when two permanent magnets are used it must be ensured that in each case like poles are opposite one another on the two sides of the valve body.

Integrally formed on the edge of the cover 43 and of the upper housing part 40 respectively opposite the film hinge 44 are two half shells 46, 49 that, with the cover closed, bound a chamber with a passage for a power supply cable 56 for the magnet coil. The chamber thus formed can serve to anchor a strain relief device or an anti-kink guard 59, integrally formed on the supply cable 56, for the supply cable. Latching eyes 51 and latching noses 52 integrally formed on either side of the half shells effect locking of the cover 43 in a closed position.

Furthermore, there are integrally formed on the outer walls of the upper housing part 40 latching noses 48 complementary to the latching lugs 20 of the lower part 1, and a semicircular projection 49 that is completed by the corresponding projection 16 of the lower housing part to form a socket in which the inlet line 34 of the valve is retained. Furthermore, a second fastening lug 50 is integrally formed in an orientation orthogonal to the fastening lug 21 on the lower housing part 1.

The assembly of the solenoid valve according to the invention requires only a few simple steps during which it is not necessary to observe dimensional accuracy because the positions of the individual components relative to one another are prescribed by the configuration of the two housing parts 1, 40. In a first step, at least one of the housing parts is fitted with a permanent magnet. Then, the valve body 13 with the inlet line 34 mounted thereon, and the magnet coil 9 are inserted into the compartments, provided therefore in one housing part. By latching the upper housing part 40 on the lower part 1, the valve body 13 and the magnet coil 9 are fixed in their positions. At this stage, the valve body 31 can, here, already be provided with the outlet lines 37, 38; because the ends 28 of the valve body 31 are exposed, it is, however, also possible for the outlet lines 37, 38 not to be fastened, for example, soldered on, until afterwards.

Subsequently, a strain relief device of the supply cable, mounted on the contact shoe 25, of the magnet coil is laid into the half shell 46, and the cover 43 is shut.

If only one permanent magnet is used, it is also possible, given a housing part that contains no magnet, for the cutout 15 provided for accommodating the inlet line 34 to be widened to a slot that permits the valve body to rotate about its axis. This variant can facilitate the installation of the valve in specific circumstances of use.

I claim:

1. A solenoid valve, comprising:
    a housing of a non-magnetic material, said housing having two compartments and a wall with a receptacle;
    a valve body having an inlet and two outlets;
    a valve element moveably disposed in said valve body between two end positions corresponding respectively to different switching positions of said valve element, said two end positions of said valve element defining a middle position therebetween, said receptacle facing said middle position;
    at least one permanent magnet disposed in said receptacle for holding said valve element in a respectively assumed one of said two end positions; and
    a magnet coil for exerting on said valve element a magnetic force effecting a shift into a respective one of said two end positions, said magnet coil and said valve body accommodated in said two compartments.

2. The solenoid valve according to claim 1, wherein:
    said housing has an interior; and
    said receptacle of said permanent magnet is a recess of said housing open toward said interior.

3. The solenoid valve according to claim 2, wherein said housing has latching hooks holding said permanent magnet in said recess.

4. The solenoid valve according to claim 1, wherein:
    said coil and said valve body have longitudinal axes; and
    said housing has two parts adjoining one another at a plane defined by said longitudinal axes of said coil and of said valve body.

5. The solenoid valve according to claim 4, wherein said at least one permanent magnet is two permanent magnets each disposed on one of said two parts.

6. The solenoid valve according to claim 5, wherein:
    said valve body is cylindrical with an axial center and two opposing end faces;
    said inlet is disposed at said axial center;
    said two outlets are respectively disposed at said two opposing end faces;
    said housing has a socket formed on said two parts; and
    an inlet tube is connected to said inlet and is guided through said socket.

7. The solenoid valve according to claim 6, wherein:
    said cylindrical valve body has a longitudinal direction;
    said housing has an interior;
    said receptacle of said permanent magnet is a recess of said housing open toward said interior;

said housing has latching hooks holding said permanent magnet in said recess; and said latching hooks are spaced apart transverse to said longitudinal direction.

8. The solenoid valve according to claim 1, wherein:

said magnet coil has supply terminals; and said housing has a cover permitting access to said supply terminals.

9. The solenoid valve according to claim 8, wherein a film hinge connects said cover to said housing.

10. The solenoid valve according to claim 9, wherein:

said magnet coil has a supply cable;

said cover has a cover edge opposite said film hinge;

said housing has a housing edge adjoining said cover edge when said cover is closed; and said housing and said cover each have a strain relief device for said supply cable at said cover edge and said housing edge.

11. The solenoid valve according to claim 8, wherein said magnet coil has a supply cable and said cover has an adjoining edge with respect to said housing, and including a strain relief device for said supply cable, said strain relief device disposed at said cover at said adjoining edge.

12. The solenoid valve according to claim 8, wherein:

said magnet coil has a supply cable; and at least one of said housing and said cover has a strain relief device for said supply cable.

13. The solenoid valve according to claim 1, wherein:

said valve body is cylindrical with an axial center and two opposing end faces;

said inlet is disposed at said axial center; and said two outlets are respectively disposed at said two opposing end faces.

14. The solenoid valve according to claim 1, wherein said housing has an outer surface and a plurality of fastening lugs with different orientations disposed on said outer surface.

15. The solenoid valve according to claim 1, wherein:

said housing has an outer surface; and said valve body has ends extending outside said outer surface and to be joined to respective outlet lines.

16. The solenoid valve according to claim 1, wherein:

said housing has an outer surface; and said valve body extends past said outer surface and are to be joined to respective outlet lines.

17. The solenoid valve according to claim 1, wherein said housing is of a heat resistant plastic material.

18. The solenoid valve according to claim 17, wherein said plastic is polypropylene.

19. A solenoid valve for a refrigerating machine, comprising:

a housing of a non-magnetic material, said housing having two compartments and a wall with a receptacle;

a valve body having an inlet and two outlets;

a valve element moveably disposed in said valve body between two end positions corresponding respectively to different switching positions of said valve element, said two end positions of said valve element defining a middle position therebetween, said receptacle facing said middle position;

at least one permanent magnet disposed in said receptacle for holding said valve element in a respectively assumed one of said two end positions; and a magnet coil for exerting on said valve element a magnetic force effecting a shift into a respective one of said two end positions, said magnet coil and said valve body accommodated in said two compartments.

* * * * *